United States Patent
Guruprakash

(10) Patent No.: US 7,523,089 B2
(45) Date of Patent: Apr. 21, 2009

(54) OFFLINE SERVICING OF IMAGE FILES

(75) Inventor: Bangalore Guruprakash, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 352 days.

(21) Appl. No.: 11/241,435

(22) Filed: Sep. 30, 2005

(65) Prior Publication Data

US 2007/0078801 A1    Apr. 5, 2007

(51) Int. Cl.
*G06F 17/30* (2006.01)

(52) U.S. Cl. .................................. 707/1; 707/104.1

(58) Field of Classification Search ............. 707/104.1, 707/1, 2, 6, 200; 719/328
See application file for complete search history.

(56) References Cited

U.S. PATENT DOCUMENTS

| | | | |
|---|---|---|---|
| 5,359,730 A | 10/1994 | Marron | |
| 5,555,416 A | 9/1996 | Owens et al. | |
| 5,999,740 A | 12/1999 | Rowley | |
| 6,038,399 A | 3/2000 | Fisher et al. | |
| 6,080,207 A | 6/2000 | Kroening et al. | |
| 6,286,138 B1 | 9/2001 | Purcell | |
| 6,292,941 B1 | 9/2001 | Jollands | |
| 6,321,219 B1 * | 11/2001 | Gainer et al. | 707/3 |
| 6,487,713 B1 | 11/2002 | Cohen et al. | |
| 6,772,192 B1 | 8/2004 | Fulton et al. | |
| 6,804,774 B1 | 10/2004 | Larvoire et al. | |
| 6,832,373 B2 | 12/2004 | O'Neill | |
| 6,938,250 B2 | 8/2005 | Cohen et al. | |
| 6,947,954 B2 | 9/2005 | Cohen et al. | |
| 7,216,344 B2 * | 5/2007 | Cobb et al. | 717/174 |
| 2002/0156877 A1 | 10/2002 | Lu et al. | |
| 2003/0233363 A1 | 12/2003 | Cohen et al. | |
| 2003/0233379 A1 | 12/2003 | Cohen et al. | |
| 2003/0233644 A1 * | 12/2003 | Cohen et al. | 717/171 |
| 2003/0233645 A1 * | 12/2003 | Cohen et al. | 717/174 |

OTHER PUBLICATIONS

Howland, *Managing Computer Science Laboratories Using Open Software*, Proceedings of the Seventh Annual Consortium for Computing in Small Colleges Central Plains Conference on the Journal of Computing in Small Colleges, 2001, pp. 117.

Hutchinson et al., *Logical vs. Physical File System Backup*, Proceedings of the Third Symposium on Operating Systems Design and Implementation, 1999, pp. 239.

Microsoft, *Microsoft TechNet*: Ximage and WIM Image Format, www.microsoft.com, pp. 1-3, Aug. 19, 2005.

Microsoft, *Microsoft TechNet*: Windows Vista Deployment & Enhancements, www.microsoft.com, pp. 1-7, Aug. 19, 2005.

White Paper, "Microsoft Windows 2000 Server—Remote Operating System Installation," Microsoft Corporation, pp. i-iv, 1-41, 1999, U.S.A.

Yang, *Creating the Standard Desktop Environment in a Non*, Oct. 17-20, 2001.

Zhang et al., "A Modeling Perspective of Image-Based Installation," Dell White Paper, pp. 1-13, Mar. 2002, U.S.A.

* cited by examiner

*Primary Examiner*—Cheryl Lewis
(74) *Attorney, Agent, or Firm*—Senniger Powers LLP

(57) ABSTRACT

A method for offline servicing of an image file by mapping the image to a directory using a file system mini-filter driver. The file system mini-filter driver maps the contents of the image to the directory and provides either read-only or read-write access to the contents of the image. The method further displays the contents of the image mapped to the directory for review by a user.

16 Claims, 5 Drawing Sheets

OFFLINE SERVICING OF IMAGE FILES

BACKGROUND

Computer users conventionally use image files to create a snapshot of a computer memory, such as a hard drive. One such image file is a Windows Imaging (WIM) file, which is a collection of image files that may or may not contain an operating system (OS) and its components. The WIM image format, which is file-based rather than sector-based, describes the layout of the image files. The WIM image can be used for any number of imaging applications, including the setup and deployment (including upgrades) of an OS (e.g., a Windows OS). Beyond OS setup and deployment, the WIM images can also be used for backing up or restoring a system or volume with data and executable files. Conventional tools and application programming interfaces (APIs) are available for creating and restoring these images to or from volumes or directories on a system.

Known image files, including WIM image files, share two key features, namely: the contents of a stored image file are essentially opaque and image files themselves are static after creation. With respect to the opaque nature of the contents of an image file, once an image file is created, its contents cannot be accessed unless the file is restored in its entirety, or booted, to a system volume or a directory. This restoration of the entire image file can be cumbersome when there is a need to access only a small portion of the contents of the image file (e.g., a small number of files or file identifiers only). For example, a user may wish to verify the contents of an existing image file to ensure that it has the latest binary files. To do so conventionally, the user would need to restore, or boot, the entire image file to a system volume or directory to access the files of interest. This restoration may take considerable time, depending on the number of image files and their sizes.

With respect to the static nature of known image files, conventionally, once an image file is created, its contents cannot be changed or updated. This inability to modify an image file can be a problem in certain scenarios where the capability to modify the contents of an image would be helpful. Conventionally, once an image file is created, the only way to update or apply a patch to files within the image file is to recreate the entire image file with the modifications and then discard the old image file. Generating an entirely new image file can take some time, particularly if the size of the image is large, or if the number of image files that need to be recreated is large. A way to view and/or modify the contents of an image file would be useful.

SUMMARY

The following simplified summary provides a basic overview of some aspects of the present technology. This summary is not an extensive overview. It is not intended to identify key or critical elements or to delineate the scope of this technology. This Summary is not intended to be used as an aid in determining the scope of the claimed subject matter. Its purpose is to present some simplified concepts related to the technology before the more detailed description presented below.

Accordingly, methods for listing the contents of an image file for offline viewing and servicing by a user are disclosed. The contents of the image file may be outlined by a control program for review by the user.

BRIEF DESCRIPTION OF THE DRAWINGS

Corresponding reference characters indicate corresponding parts throughout the drawings.

DETAILED DESCRIPTION

Figure 1:
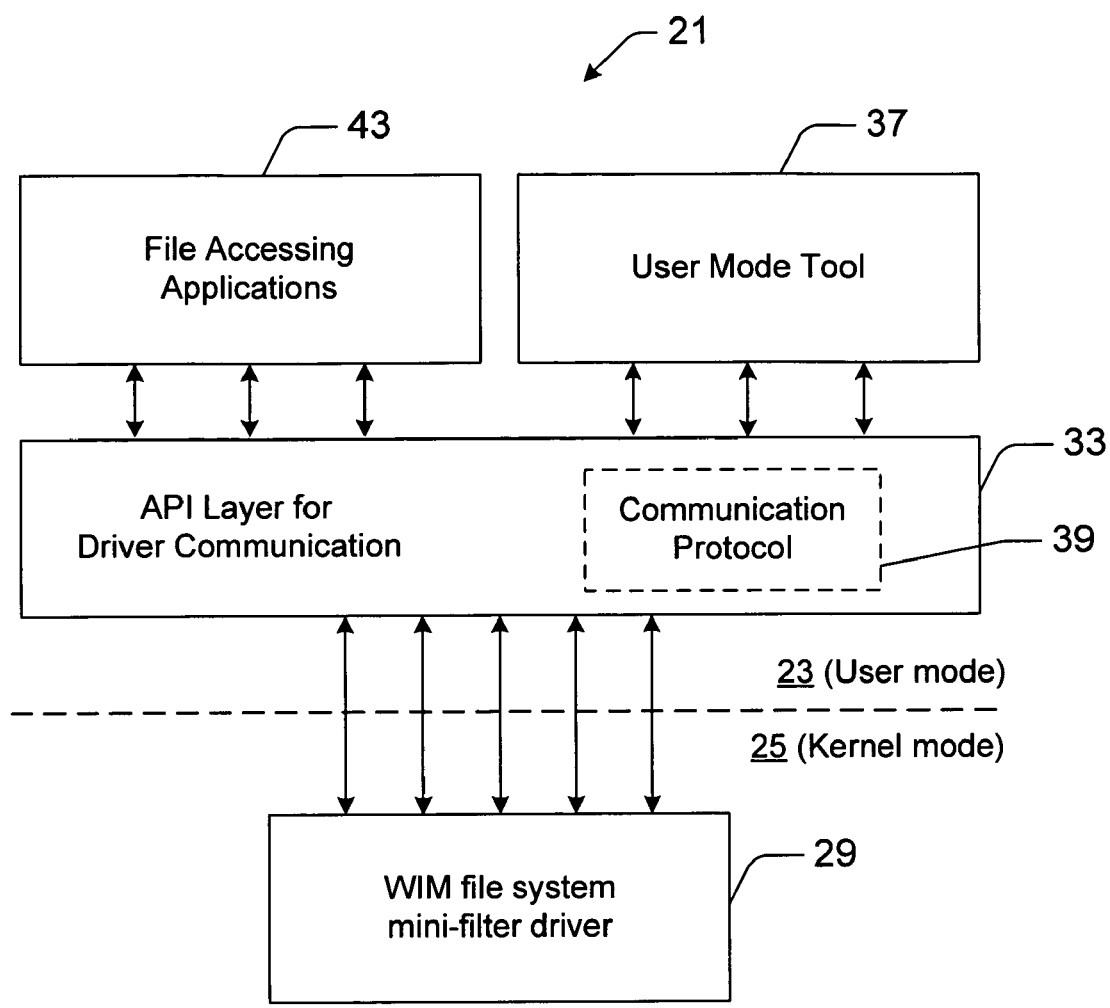
FIG. 1 is a diagram of a system of one embodiment of the present invention for servicing a Windows Imaging (WIM) image format image in an offline state.
Figure 2:
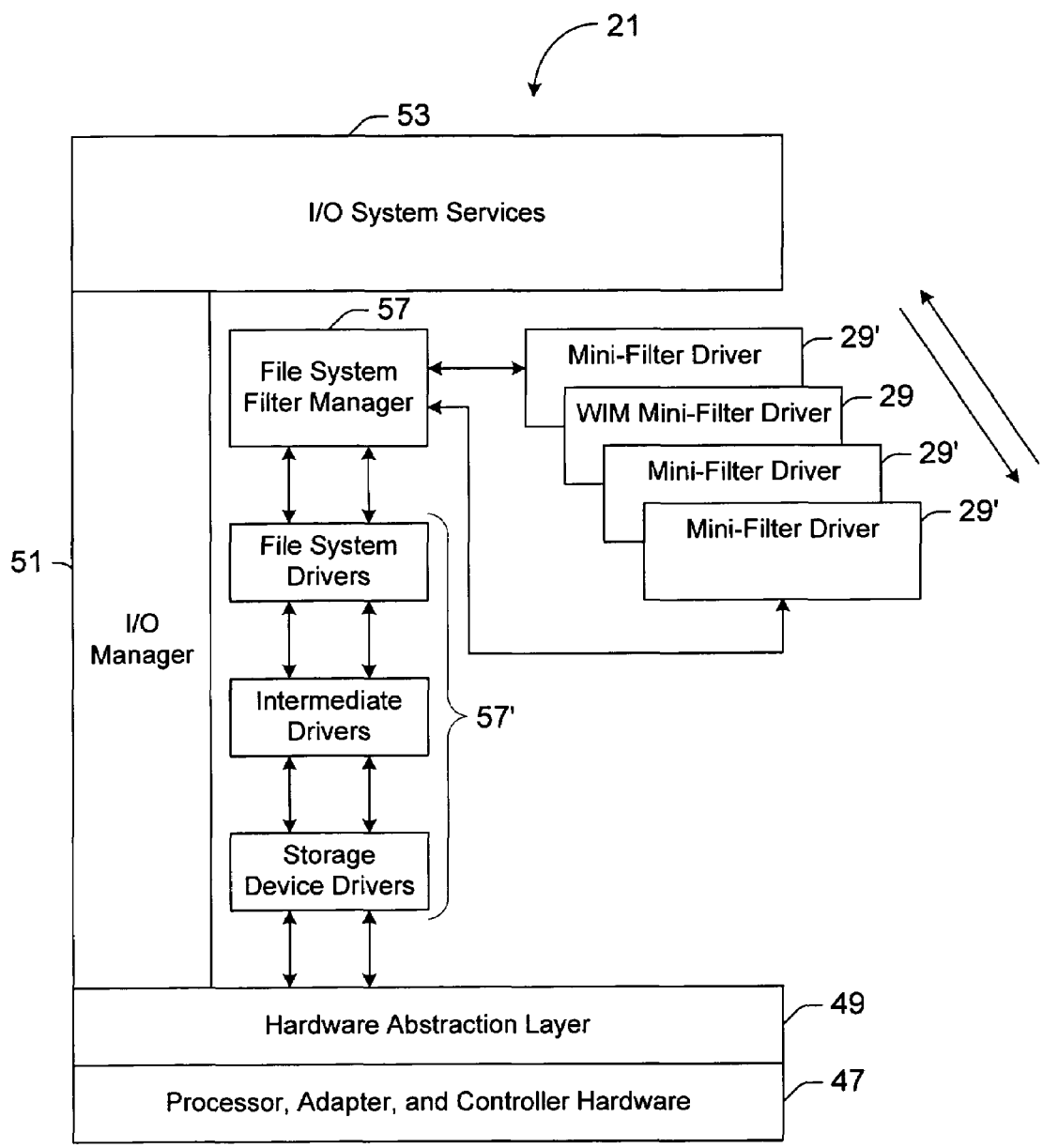
FIG. 2 is a diagram of the kernel mode of the system of FIG. 1.
Figure 5:
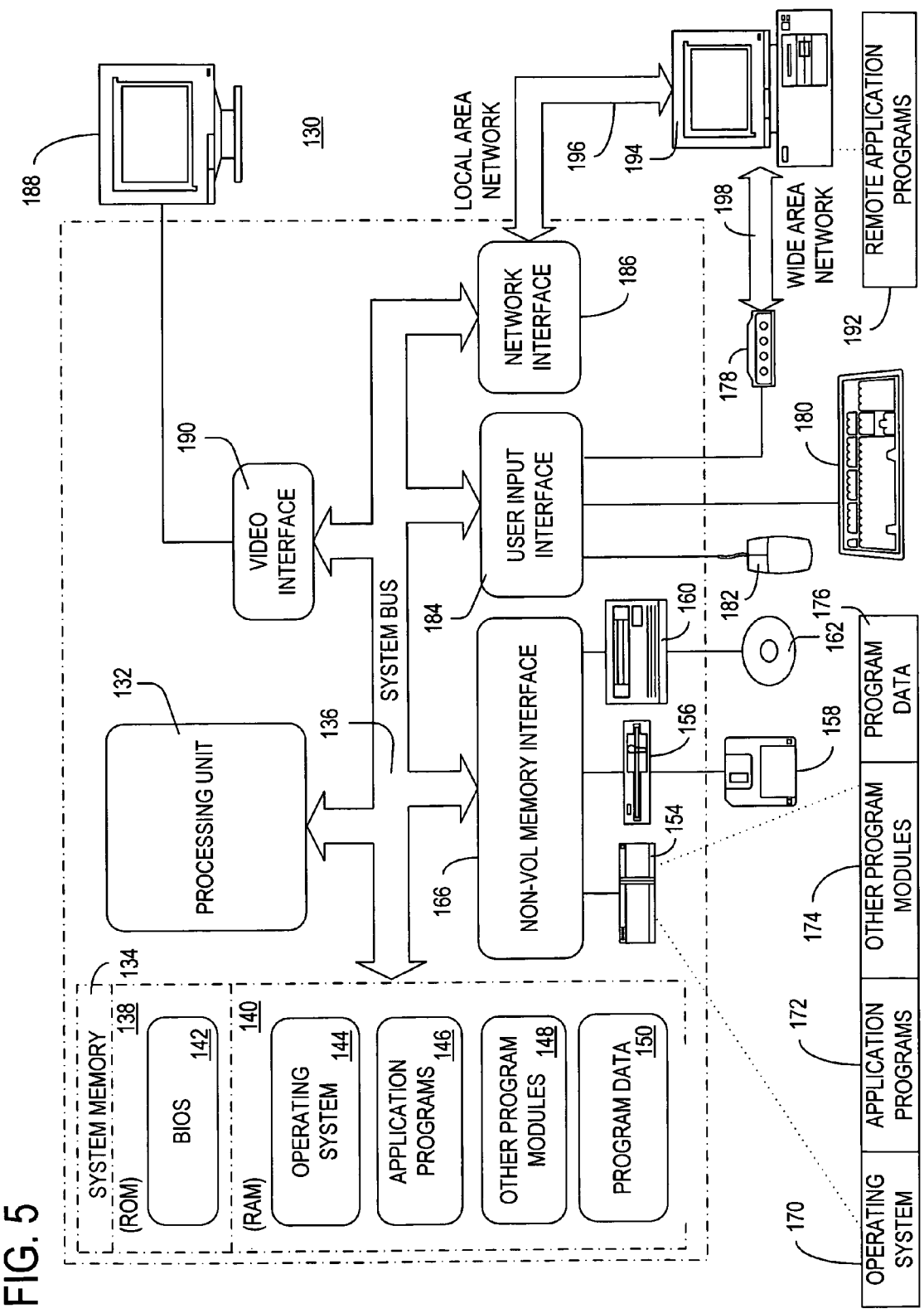
FIG. 5 is a block diagram illustrating one example of a suitable computing system environment in which one embodiment of the invention may be implemented.

Referring now to FIGS. 1 and 2, a system, generally indicated at 21, is disclosed for offline servicing a file-based image format image file, such as a Windows Imaging (WIM) image format image, i.e., servicing the image file without having to restore the entire image to a hard disk drive, depicted as 154 in FIG. 5. Such image files may be used for any number of imaging applications, for example, to create a snapshot of a computer memory, such as a hard disk drive 154. One such image file is the WIM image noted above, which is a collection of image files that may or may not contain an operating system (OS) and its components. The WIM image format is one type of image that describes the layout of the image files. The WIM image can also be used for the setup and deployment (including upgrades) of an OS (e.g., a Microsoft® Windows OS) or for readily backing up or restoring a system or volume with data files. As used herein, the terms "offline" and "offline state" with respect to a WIM image refer to the image when stored in a memory for later copying or booting to a computer, whereas the term "online state" with respect to a WIM image refers to an image that has been restored, or imaged, to a hard disk drive 154 and, if necessary, booted to the imaged portion of the hard disk drive. Conventionally, to revise a WIM image, the WIM image must be restored, or imaged, to a hard disk drive 154, booted to the imaged-portion of the hard disk drive, if needed, and modified by making changes to the files or recreating the image file by capturing the portion of the hard disk drive including the modified files, all of which may be very time consuming. Embodiments of the systems, computer-readable media, and methods of the present invention offer an alternative to this process.

Figure 3:
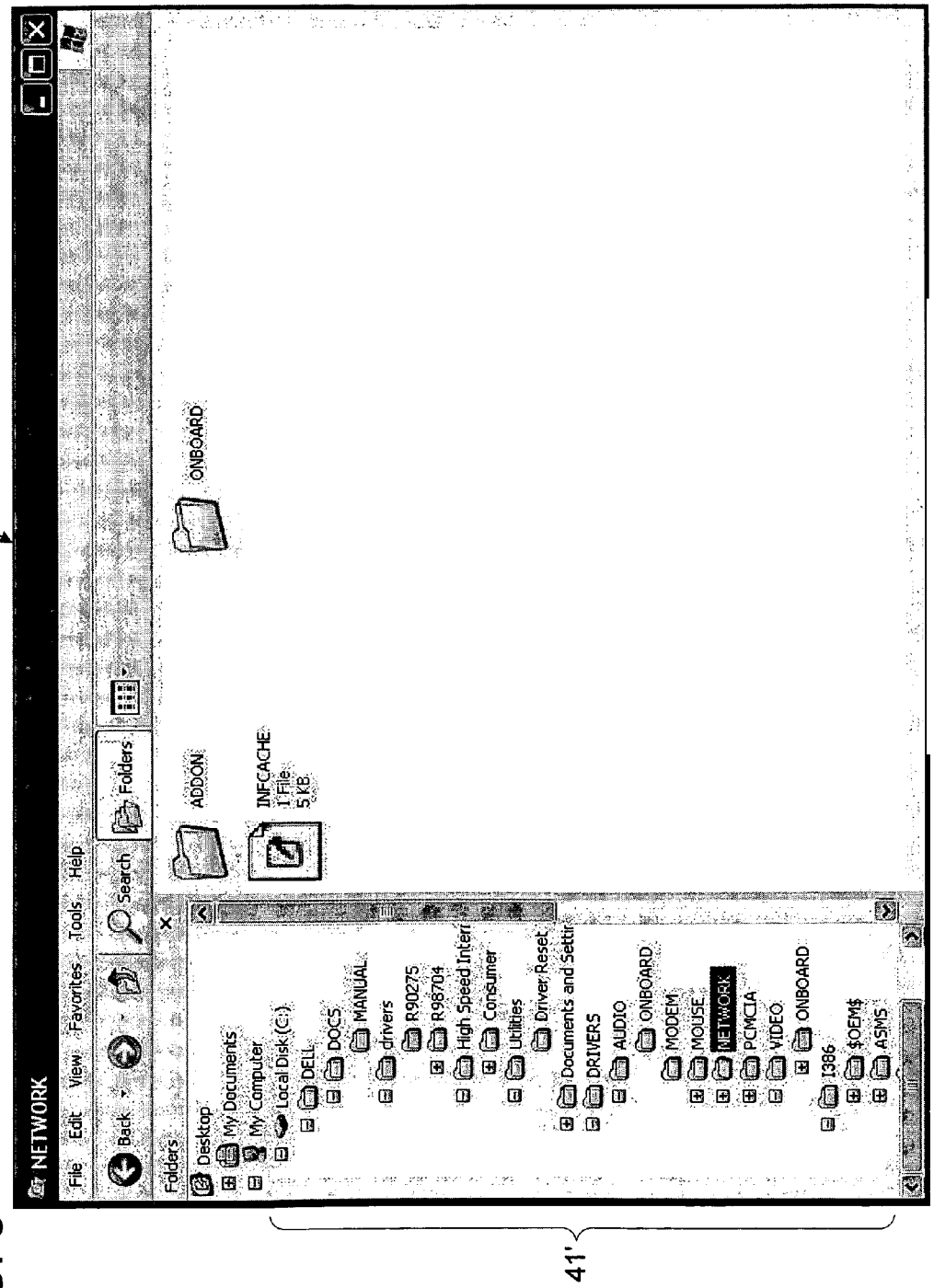
FIG. 3 is a screenshot of an exemplary image mapped to a directory.
Figure 4:
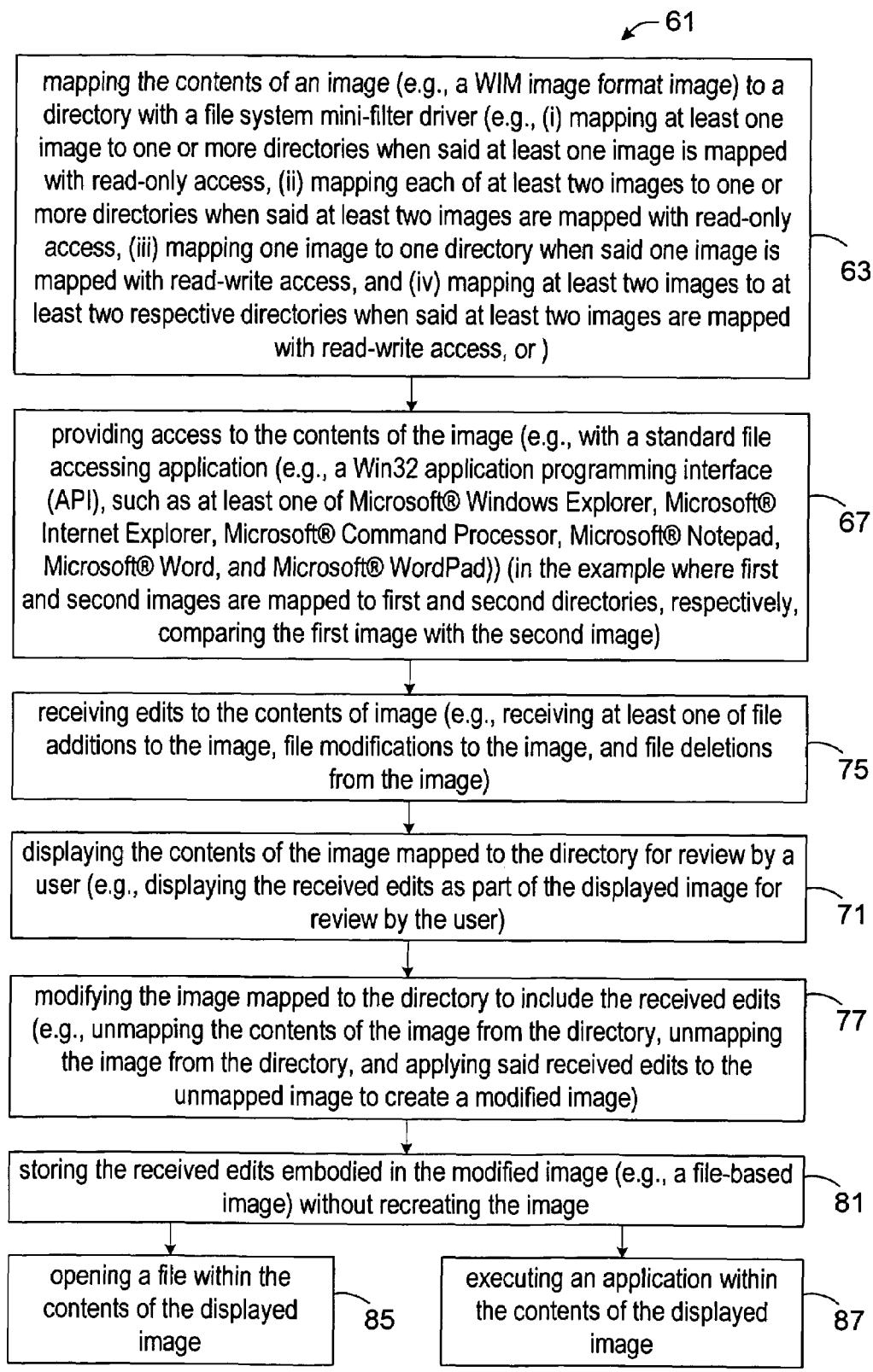
FIG. 4 is a flow diagram of a method of one embodiment of the present invention.

In particular, the system 21 (e.g., a computer system) comprises both a user mode 23 components and a kernel mode 25 components. The kernel mode components comprise a WIM file system mini-filter driver 29 which operates in the kernel mode as described in detail below. Other drivers, such as non-mini-filter drivers and other alternative embodiments, having the properties described herein are also contemplated as within the scope of one or more embodiments of the claimed invention. The system 21 further comprises an application programming interface (API) layer 33 residing in the user mode 23 for communicating with the WIM file system mini-filter driver 29. The system 21 also includes a user mode tool 37 for use by a user in communicating with the API layer 33. The API layer further comprises a communication protocol 39 providing a basis for interaction between the kernel mode 25 WIM file system mini-filter driver 29 and the user mode tool 37. Application writers seeking to compose applications complementary to one or more embodiments of the present invention can use this communication protocol 39 via a set of published APIs. Moreover, the WIM mini-filter driver 29 is configured to map the contents of the WIM image format image to a directory, generally indicated 41, in FIG. 3, and more particularly to the paths 41' of the directory. The user may then view the contents of the WIM image mapped to the directory 41 with a standard file accessing application 43. In one alternative embodiment, the user may access the mapped image with Microsoft® Windows Explorer, as shown in FIG. 3. As used herein, the term "mount" may be used interchangeably with the term "map," as both are directed to making the contents of an image file accessible via the directory where the image contents are mapped, or mounted.

APPENDIX A provides an exemplary set of APIs for the user-mode applications to interact with mini-filter driver 29 to facilitate offline servicing of images. The APIs shown in the appendix allow applications to quickly and easily map or unmap WIM files to some specified map directories.

FIG. 2 depicts a more detailed view of the kernel mode 25 of one exemplary embodiment of the present invention. This system 21 includes processor, adapter, and controller hardware 47, supporting a hardware abstraction layer 49, which in turn supports an input/output (I/O) manager 51 and an I/O system services element 53. The system further includes a file system filter manager 57 which manages the WIM mini-filter driver 29 and other mini-filter drivers 29'. The file system filter manager 57 interacts with other drivers 57' and system kernel mode 25 components to facilitate use of the WIM mini-filter driver 29. In particular, the WIM mini-filter driver 29 monitors all calls from the file system filter manager 57. If a call is on any of the directory paths 41' where the image is mapped, the WIM mini-filter driver 29 will intercept the call and handle (e.g., mapping the calls to the appropriate data from the WIM file) the request that triggered the call, thereby providing a transparent user experience. The WIM mini-filter driver 29 needs to be registered with the file system filter manager 57 for it to intercept calls made to the file system and map the requests to data within the WIM image file. If the WIM mini-filter driver 29 is not already loaded, the user mode tool 37 will load an instance of the WIM mini-filter driver and register it with the file system filter manager 57, if necessary. Further details of the system 21 will be discussed in greater detail below with respect to the methods of one or more embodiments of the present invention.

In another exemplary system, depicted in FIGS. 1, 2, and 5, a system 21 for servicing, by a computer 130 (FIG. 5), a Windows Imaging (WIM) image format image stored on one or more target computer-readable media and having an online state and an offline state, is disclosed. The system 21 comprises a user interface 184 (FIG. 5) associated with the computer 130 and adapted for providing access to the contents of the WIM image format image. The system 21 further comprises a software tool executing on the computer 130, the software tool responsive to the user interface 184 to provide access to the contents of the WIM image format image for review by a user when the WIM image format image is in the offline state. The software tool is further adapted to edit the WIM image format image in the offline state. The software tool is further adapted to at least one of open a file within the contents of the WIM image format image and execute an application within the contents of the WIM image format image, as will be discussed in detail below with respect to the methods of one or more embodiments of the present invention.

Methods Utilizing a Seed Media Item

In one exemplary embodiment depicted in FIG. 2, a method, generally indicated 61, for offline servicing of a Windows Imaging (WIM) image format image is disclosed. The method comprises mapping, at 63, the contents of the WIM image format image to a directory 41 with the WIM file system mini-filter driver 29. In one example, the mapping of the WIM image format image further comprises mapping, also at 63, the WIM image format image with at least one of read-only access and read-write access. Mapping with read-only access allows a user to access, but not modify, the image, while mapping with read-write access allows a user to both access and modify the image, as will be explained in greater detail below. For example, when the image is mapped with read-only access, the mapping of the WIM image format image comprises mapping at least one image, and possibly to several different directories. In further examples, also at 63, the method may comprise (i) mapping at least one image to one or more directories when the at least one image is mapped with read-only access, (ii) mapping each of at least two images to one or more directories when the at least two images are mapped with read-only access, (iii) mapping one image to one directory when the one image is mapped with read-write access, and (iv) mapping at least two images to at least two respective directories when the at least two images are mapped with read-write access. In other words, the method may act as a multiple reader, single writer, to protect the integrity of the original image file. If an image file is mapped in read-only mode, the image may be mapped to several different directories, because the underlying image will not change. Alternately, if you mount an image file for read-write access, the same image file cannot be mounted again for either read-only or read-write access, until the image file mapped for read-write access is unmapped. Moreover, a first image may be mapped to a first directory for read-write access and a second image may be mapped at the same time to a second directory for read-write access, because the first and second images are different image files. This mapping organizes the contents of the WIM image format image into a format readily understandable to a user. Once mapped 63, the method further comprises providing access, at 67, to the contents of the WIM image format image. In one exemplary embodiment, the providing access 67 may further comprise providing access to the mapped image with a standard file accessing application. In one alternative embodiment, the providing access 67 may further comprise accessing the mapped image with a Win32 application programming interface (API). In still another alternative embodiment, the providing access may further comprise accessing the mapped image with a file system explorer tool, such as at least one of Microsoft® Windows Explorer, Microsoft® Internet Explorer, Microsoft® Command Processor, Microsoft® Notepad, Microsoft® Word, and Microsoft® WordPad. Other alternative means for providing access to the mapped image are also contemplated as within the scope of one or more embodiments of the claimed invention.

In another alternative embodiment, the mapping 63 of at least one image may further comprise mapping a first image to a first directory 41 and mapping a second image to a second directory, whereby the providing access 67 further comprises comparing the first image with the second image. This comparison provides a user with the ability to readily compare one image to another, whereby changes in the images may be readily ascertained. This comparison may be manual, or by hand, or may be undertaken computationally by a processor 132 (e.g., FIG. 5), whereby any and all differences between the first and second images are readily understood. In still another alternative embodiment, the method may further comprise displaying, at 71, the contents of the WIM image format image mapped to the directory for review by a user. An example of such a display is shown as the directory 41 of FIG. 3. With such a display of the image in a directory format, a user can readily review and consider the contents of the image. This allows the user to make a variety of decisions based upon the contents of the image, including whether or not the image contains the files desired by the user and whether those files are arranged in an appropriate structure.

Beyond providing access 67 to the contents of the WIM image and displaying 71 the contents of the image for review by a user, the method further comprises receiving edits, at 75, to the contents of the WIM image format image. For example, a user viewing the displayed contents of the image in a directory 41 may wish to change one or more features of the image without recreating the image. Such receiving edits may comprise receiving at least one of file additions to the image, file modifications to the image, and file deletions from the image. Any such additions, modifications, and deletions may be utilized without departing from the scope of the one or more embodiments claimed invention. Once such edits are received, the method may further comprise displaying, at 71, the contents of the WIM image format image with the received edits as part of the displayed image for review by the user. Because the edits are displayed, the user can view a current snapshot of the image as it would appear if the edits were applied. It is also contemplated that the user may disengage such a display of the received edits to view the image in its present form, without the received edits. In another alternative embodiment, it is also contemplated that the user may view one or more of the received edits as applied to the image, while one or more of the other received edits is now shown as applied to the displayed image.

Once such edits are received 75, the method may further comprise modifying, at 77, the WIM image format image mapped to the directory 41 to include the received edits. By modifying 77 the WIM image format image with the received edits, a user has the ability to modify the WIM image without recreating the image in an online state, as is conventional. By modifying 77 the existing image, much effort and time can be saved over conventional image recreation techniques, as would be readily understood by one skilled in the art. In particular, the modifying 77 may comprise unmapping the contents of the WIM image format image from the directory 41, unmapping the WIM image format image from the directory, and applying the received edits to the unmapped WIM image format image to create a modified WIM image format image. Modifications requested by the user are recorded in temporary files while the WIM image is mapped for use as described above. While unmapping the WIM image format image from the mapped directory 41, the user also has the option to discard the changes made to the WIM image format image. The method may further comprise storing, at 81, the modified WIM image format image in an offline state without recreating the image, which would conventionally require restoring the old image, adding the modifications, and re-capturing into a new image. In particular, the storing of the WIM image format image may comprise storing a file-based image, rather than conventional sector-based imaging.

In another alternative embodiment, the method may further comprise opening, at 85, a file within the contents of the displayed image. For example, if a user wishes determine if an image contains the correct version of a file, the user may open the file in question directly from the accessed image. In this manner, all files stored in the image may be reviewed for accuracy, without bringing the entire image into an online state. Offline review of the contents of the image is particularly useful for a large image that would take some time to bring to an online state for review. According to the present opening 85, the contents of any file may be readily reviewed in a copy of the image, which is achieved much more efficiently than by having to restore the image to a portion on the hard disk drive 154 and verify the contents of the image.

In yet another alternative embodiment, the method may further comprise executing, at 87, an application within the contents of the displayed image. As with the opening 85 of a file within the contents of the displayed image, the executing 87 of an application allows the user to determine if an image contains the correct version of an application, or other executable file. Moreover, by executing 87 an application within the image, the behavior of the application within the image may be understood without having to restore the image.

General Purpose Computing Device

FIG. 5 shows one example of a general purpose computing device in the form of a computer 130. In one embodiment of the invention, a computer such as the computer 130 is suitable for use in the other figures illustrated and described herein. In one example, the system 21 discussed above may be embodied by computer 130. Computer 130 additionally has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. In one example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown). In one example, the user interfaces discussed above may be embodied by such input devices and monitors.

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. It will be appreciated that the network connections shown are exemplary and other means of establishing a communications link between the computers may be used.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the embodiments of the invention are operational with numerous other general purpose or special purpose computing system environments or configurations. The computing system environment is not intended to suggest any limitation as to the scope of use or functionality of the embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, computer 130 executes a computer-implemented method of operation on one or more data processing devices such as described above for servicing, by a computer, an image having a file-based image format in an offline state. The computer 130 (or its components) maps the contents of the image to a directory with a file system filter driver. The computer 130 (or its components) provides access to the contents of the image. The computer 130 (or its components) displays the contents of the image mapped to the directory for review by a user.

Also in operation, computer 130 executes a computer-implemented method of operation on one or more data processing devices such as described above for servicing, by a computer, an image having a file-based image format in an offline state. The computer 130 (or its components) mapping the contents of the image to a directory with a file system filter driver. The computer 130 (or its components) providing access to the contents of the image. The computer 130 (or its components) receiving edits to the contents of the image.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

APPENDIX A

The WIMMountImage API can be used to mount an Image in a WIM file to the specified directory.

```
/// <summary>
///    The WIMMountImage method maps the contents of the given
///    image in a WIM file to the specified mount directory. After the
///    successful completion of this operation users or applications can
///    access the contents of the Image mapped under the mount directory.
/// </summary>
/// <param name="lpszMountPath">
///    The full path of the directory to which the WIM has to be mounted.
///    This parameter is required and cannot be NULL.
/// </param>
/// <param name="lpszWimFileName">
///    The full file name of the WIM file that has to be mounted. This
///    parameter is required and cannot be NULL.
/// </param>
/// <param name="dwImageIndex">
///    The index of the image in the WIM file that has to be mounted.
/// </param>
/// <param name="lpszTempPath">
///    The full path to the temp directory in which changes to the WIM
///    file can be tracked. If this parameter is NULL, the image will not be
///    mounted for edits.
/// </param>
/// <returns>
///    Returns TRUE and sets the LastError to ERROR_SUCCESS on the
///    successful completion of this method. Returns FALSE in case of a
///    failure and the LastError is set to the appropriate Win32 error value.
/// </returns>
BOOL
WINAPI
WIMMountImage(
   LPWSTR lpszMountPath,
   LPWSTR lpszWimFileName,
   DWORD dwImageIndex,
   LPWSTR lpszTempPath
   );
```

The WIMUnmountImage API can be used to unmount an Image in a WIM file from the specified mount directory.

```
/// <summary>
///    The WIMUnmountImage API unmaps the contents of the given
///    image in the WIM file from the specified mount directory. After the
///    successful completion of this operation users or applications will
///    not be able to access the contents of the image previously
///    mapped under the mount directory.
/// </summary>
/// <param name="lpszMountPath">
///    The full path of the directory to which the WIM has been mounted.
///    This parameter is required and cannot be NULL.
/// </param>
/// <param name="lpszWimFileName">
///    The full file name of the WIM file that has to be unmounted. This
///    parameter is required and cannot be NULL.
/// </param>
/// <param name="dwImageIndex">
///    The index of the image in the WIM file that has to be unmounted.
/// </param>
/// <param name="bCommitChanges">
///    Flag to indicate whether changes (if any) to the WIM file should
///    be committed before unmounting the WIM file. This flag will have
///    no effect if the WIM file was mounted to not allow edits.
/// </param>
/// <returns>
///    Returns TRUE and sets the LastError to ERROR_SUCCESS on the
///    successful completion of this method. Returns FALSE in case of a
///    failure and the LastError is set to the appropriate Win32 error value.
/// </returns>
BOOL
WINAPI
WIMUnmountImage(
   LPWSTR lpszMountPath,
   LPWSTR lpszWimFileName,
   DWORD dwImageIndex,
   BOOL bCommitChanges
   );
```

The WIMGetMountList API can be used to get the list of WIM files and the current mount paths to which they are mounted.

```
/// <summary>
///    The WIMGetMountList API gets a list of mounted images,
///    their corresponding mount paths and whether they have been
///    mounted for Read-only access or not.
/// </summary>
/// <param name="lpMountList">
///    The buffer to which the information about all mounted images
///       is written to.
/// </param>
/// <param name="lpcbBufferSize">
///    The pointer to the size of the input buffer. If the input buffer is not
///    large enough to hold all the mounted images information, then the
///    size of the buffer needed is written to this pointer. If the buffer
///    was large enough to hold all mounted image information, the pointer
is updated to hold the actual size of/// the buffer that was used.
/// <returns>
///    Returns TRUE and sets the LastError to ERROR_SUCCESS on the
///    successful completion of this method. Returns FALSE in case of a
///    failure and the LastError is set to the appropriate Win32 error value.
/// </returns>
BOOL
WIMGetMountList(
   LPWIM_MOUNT_LIST lpMountList,
   LPDWORD lpcbBufferSize
   );
```

The buffer containing the list of mounted Images is an array of _WIM_MOUNT_LIST structure.

```
//
// The WIM_MOUNT_LIST structure used for getting the list of
// mounted images.
//
typedef struct _WIM_MOUNT_LIST
{
   WCHAR WimPath[MAX_PATH];
   WCHAR MountPath[MAX_PATH];
   DWORD ImageIndex;
   BOOL MountedForRW;
}
WIM_MOUNT_LIST, *PWIM_MOUNT_LIST,
*LPWIM_MOUNT_LIST;
```

The WIMIsImageMounted API can be used to check whether a particular image in a WIM file is mounted to a directory or not. It can also be used to check whether any of the images in the WIM file is currently mounted to a directory or not.

```
/// <summary>
///    The WIMIsWimMounted API checks whether an image within the
///    given WIM file is mounted under any mount directory.
/// </summary>
/// <param name="WimFileName">
///    The full path file name of the WIM file. This parameter is required
///    and cannot be NULL.
///</param>
/// <param name="ImageIndex">
///    The index of the image in the WIM file that has to be checked
///    whether it is currently mounted or not. If the specified image
///    index is zero, then this API will check if any of the images
///    within the WIM file is currently mounted or not.
/// </param>
/// <returns>
///    A BOOL true value if the image within the WIM file is
///    currently mounted. A BOOL false value otherwise.
/// </returns>
BOOL
WINAPI
WIMIsImageMounted(
    LPWSTR lpszWimFileName,
    DWORD dwImageIndex
    );
```

The WIMIsFileChanged API can be used to check whether a given file within a WIM file has been changed or not after it was mounted.

```
/// <summary>
///    The WIMIsFileChanged API checks whether the given file within a
///    WIM file has been changed after the WIM file was mounted.
/// </summary>
/// <param name="WimFileName">
///    The full file name of the WIM file that is mounted. This parameter is
///    required only if the MountPath parameter is not specified.
///</param>
/// <param name="MountPath">
///    The full path to the directory to which the WIM has been mounted.
///    This parameter is required only when the WimFileName
///       is not specified.
/// </param>
/// <returns>
///    A BOOL true value if the given file within WIM file has been
///    modified. A BOOL false value otherwise.
/// </returns>
BOOL
WIMIsFileChanged(
    PWSTR WimFileName,
    PWSTR MountPath,
    PWSTR FileName
    );
```

What is claimed is:

1. A method for servicing, by a computer, an image in an offline state, said image having a file-based image format, said method comprising:
   mapping the contents of the image to a directory with a file system filter driver;
   providing access to the contents of the image via a file access application; and
   displaying the contents of the image mapped to the directory for review by a user utilizing the file access application, wherein the file system filter driver monitors and intercepts calls from the file access application to the file system of the directory where the image is mapped, said file system filter driver thereby providing access to the contents of the image in a hierarchal directory structure without modification of the file access application.

2. The method of claim 1 further comprising receiving edits to the mapped directory of the image via the file access application wherein the file system filter driver intercepts the call from the file access application and applies the edits to the image file.

3. The method of claim 2 wherein said receiving edits comprises receiving at least one of file additions to the mapped directory of the image, file modifications to the mapped directory of the image, and file deletions for the mapped directory of the image.

4. The method of claim 2 wherein said modifying comprises unmapping the contents of the image from the directory and applying said received edits to the unmapped image to create a modified file-based image format image.

5. The method of claim 4 further comprising storing the received edits embodied in the modified image without recreating the image.

6. The method of claim 5 wherein said storing the image comprises storing a Windows Imaging (WIM) image format image.

7. The method of claim 2 wherein said displaying the contents of the image further comprises displaying the received edits as part of the displayed image for review by the user.

8. The method of claim 2 wherein said providing access further comprises accessing the mapped image with a file system explorer tool.

9. The method of claim 1 wherein said providing access further comprises accessing the mapped image with a Win32 application programming interface (API).

10. The method of claim 1 further comprising at least one of opening a file within the contents of the displayed image and executing an application within the contents of the displayed image.

11. The method of claim 1 wherein said mapping the image comprises mapping the image with at least one of read-only access and read-write access.

12. The method of claim 11 wherein said mapping the image comprises at least one of (i) mapping at least one image to one or more directories when said at least one image is mapped with read-only access, (ii) mapping each of at least two images to one or more directories when said at least two images are mapped with read-only access, (iii) mapping one image to one directory when said one image is mapped with read-write access, and (iv) mapping at least two images to at least two respective directories when said at least two images are mapped with read-write access.

13. The method of claim 11 wherein said mapping further comprises mapping a first image to a first directory and mapping a second image to a second directory, said providing access further comprising comparing the first image with the second image, wherein differences between the first directory of the first mapped image and the second directory of the second image are displayed.

14. A computer-readable storage medium having computer-executable instructions for servicing an image in an offline state, said image having a file-based image format, said computer-readable storage medium comprising:
   a kernel mode file system mini-filter driver;
   an application programming interface (API) layer for communicating with the mini-filter driver;
   a user mode tool for use by a user in communicating with the API layer according to a communication protocol providing a basis for interaction between the kernel mode file system mini-filter driver and the user mode tool, wherein the mini-filter driver is configured to map the contents of the image to a hierarchical file system directory; and a file system filter manager, wherein the mini-filter driver monitors all calls from the filter manager and, when a call is a directory path where the image is mapped, the mini-filter driver intercepts the call and handles the request that triggered the call, thereby providing access to the image file by a file access application without modification to said file access application.

15. A method for servicing, by a computer, an image in an offline state, said image having a file-based image format, said method comprising:

mapping the contents of the image to a hierarchal directory structure with a file system filter driver;

providing access to the contents of the image via a file access application, wherein the file system filter driver monitors and intercepts calls from the file access application to the directory where the image is mapped, said file system filter driver thereby providing access to the contents of the image in the hierarchal directory structure without modification of the file access application; and receiving edits to the mapped directory of the image via the standard file accessing application; and modifying the image mapped to the directory to include the received edits, wherein the file system filter driver intercepts the received edits from the file access application and applies the edits to the image file without recreating the image file.

16. The method of claim 15 wherein said modifying comprises unmapping the contents of the image from the directory and applying said received edits to the unmapped image to create a modified file-based image format image.

* * * * *